United States Patent
Mun et al.

(10) Patent No.: US 9,806,800 B2
(45) Date of Patent: Oct. 31, 2017

(54) OPTICAL ETHERNET APPARATUS CAPABLE OF RESET CONTROL

(71) Applicants: DASAN Networks, Inc, Seongnam-si, Gyeonggi-do (KR); DASAN Network Solutions, Inc., Seongnam-si (KR)

(72) Inventors: Sang Cheol Mun, Seoul (KR); Byeong Chan Lee, Seoul (KR)

(73) Assignees: DASAN Networks, Inc., Seongnam-si (KR); DASAN Network Solutions, Inc., Seongnam-si (KR)

( * ) Notice: Subject to any disclaimer, the term of this patent is extended or adjusted under 35 U.S.C. 154(b) by 132 days.

(21) Appl. No.: 15/003,972

(22) Filed: Jan. 22, 2016

(65) Prior Publication Data

US 2017/0195042 A1    Jul. 6, 2017

(30) Foreign Application Priority Data

Jan. 4, 2016 (KR) .................. 10-2016-0000601

(51) Int. Cl.
*H04B 10/03* (2013.01)
*H04L 12/24* (2006.01)

(52) U.S. Cl.
CPC .......... *H04B 10/03* (2013.01); *H04L 41/0672* (2013.01)

(58) Field of Classification Search
CPC ...... H04B 10/03; H04L 41/0672; H04J 14/02; H04J 14/0212; H04J 14/0227; H04J 14/0283; H04Q 11/0005

See application file for complete search history.

(56) References Cited

U.S. PATENT DOCUMENTS

| | | | | |
|---|---|---|---|---|
| 6,307,652 | B1* | 10/2001 | Fassih-Nia | H04B 10/27 398/4 |
| 6,480,946 | B1* | 11/2002 | Tomishima | G11C 5/063 711/167 |
| 2014/0112661 | A1* | 4/2014 | Sakane | H04J 14/02 398/38 |

FOREIGN PATENT DOCUMENTS

| | | |
|---|---|---|
| KR | 2003-0046663 A | 6/2003 |
| KR | 10-2004-0035057 A | 4/2004 |
| KR | 10-2006-0036334 A | 4/2006 |
| KR | 10-1160448 B1 | 6/2012 |

OTHER PUBLICATIONS

Korean Office Action dated Aug. 29, 2016, in counterpart Korean Application No. 10-2016-0000601 (8 pages, in Korean).

* cited by examiner

*Primary Examiner* — Ted Wang
(74) *Attorney, Agent, or Firm* — NSIP Law

(57) ABSTRACT

An Ethernet-based optical transmission system, and particularly, an apparatus and method for controlling a remote optical Ethernet device. An optical Ethernet apparatus includes a system recovery processor configured to output a system reset signal or a system power ON/OFF control signal and a system recovery controller configured to detect a system recovery command that occurs when a predetermined signal pattern is repeated the designated number of times for a designated period of time, and to control the system recovery processor using the detected system recovery command.

20 Claims, 10 Drawing Sheets

OPTICAL ETHERNET APPARATUS CAPABLE OF RESET CONTROL

CROSS-REFERENCE TO RELATED APPLICATION(S)

This application claims priority from Korean Patent Application No. 10-2016-0000601, filed on Jan. 4, 2016, in the Korean Intellectual Property Office, the disclosure of which is incorporated herein by reference in its entirety.

BACKGROUND

1. Field

The following description relates to an Ethernet-based optical transmission system, and more particularly, to an apparatus and method for controlling remote optical Ethernet equipment.

2. Description of the Related Art

Optical Ethernet equipment has been increasingly installed for fiber to the curb (FTTC) services and fiber to the home (FTTH) services, while the installation locations thereof are expanding beyond telephone stations to unmanned remote stations, apartments' terminal boxes, utility poles, and manholes.

For example, in the case of a utility pole where L2 and L3 optical network switches are installed thereon, if the L2/L3 optical Ethernet switches have problems due to impact from external factors, such as power outage and surge, or due to traffic congestion or hackers' attack on an operating system of a switch and autonomous recovery is not possible, it is general that an administrator visits the pertinent area and resets or powers on or off the corresponding equipment to reinitiate. Hence, such a visiting of the administrator to the site in person may result in delay in recovery time, as well as increase in operation costs.

To address the above problems, Korean Patent Application Publication No. 10-2006-36334 discloses a central station apparatus that can initialize remote Ethernet equipment using a physical layer of said equipment. More specifically, a laser driver LD that constitutes an optical module at a central office side is provided with an LD enable pin, and the LD enable pin is controlled to transmit a predetermined on/off repeating signal to a remote optical Ethernet switch, thereby reinitiating a relevant optical Ethernet switch.

However, a system happens to be unnecessarily reset by the predetermined signal pattern that occurs due to instability on optical lines or unknown causes, so difficulties in system operation may be created.

SUMMARY

The following description relates to a technology that can reduce repetitive resetting of a system due to instability of an optical Ethernet apparatus. The technology is aim to provide a remote reset function, with minimum changes in an existing system. Further, the technology provided herein is to enable an existing system to add said remote reset function thereto by remote update.

In one general aspect, there is provided an optical Ethernet apparatus comprising: an optical receiver configured to perform photoelectric conversion on packet data received through an optical transmission medium; an optical transmitter configured to perform electrophotic conversion for an output to an optical transmission medium; a signal detector configured to detect whether the optical receiver receives an effective optical signal and output a resulting detection signal; a system recovery controller configured to detect, as a system recovery command, an output from the signal detector that includes a predetermined pattern which is repeated a designated number of times for a designated period of time, and to output a system recovery control command; and a system recovery processor configured to output a system reset signal or a system power ON/OFF control signal in response to the system recovery control command.

A counter may be reset in response to a signal pattern which is detected by the pattern detector and does not occur during the determined period of time.

A threshold recovery value and a reference time value may be remotely set to specific values.

The pattern detector may be implemented as a first programmable logic device, and the command recognizer may be implemented as a second programmable logic device connected to a system controller.

The first programmable logic device may be located in a first circuit module that includes the optical receiver and the optical transmitter.

The second programmable logic device may be located in a second circuit module that includes the power supply and the system controller.

The system controller may control the power supply, and may further include a remote programming part that stores program codes for programming the second circuit module.

In another general aspect, there is provided an optical Ethernet apparatus including: a plurality of optical transmitters; a plurality of optical receivers; a plurality of signal detectors; a plurality of pattern detectors; a plurality of command recognizers, each of which is provided to each of the plurality of pattern detectors; and a logic detector configured to output a system recovery control command in response to a system recovery command being detected from one of the plurality of command recognizers.

The optical Ethernet apparatus may further include: a remote recovery command generator configured to output a remote system recovery command that occurs when a predetermined signal pattern is repeated a designated number of times for a designated period of time; and a remote recovery part configured to control ON/OFF of transmission power of the optical transmitter in response to the remote system recovery command output from the remote recovery command generator.

In yet another general aspect, there is provided a recovery method for an optical Ethernet apparatus including: detecting a predetermined signal pattern of a system recovery command; detecting a system recovery command that occurs when a predetermined signal pattern is repeated a designated number of times for a designated period of time, and, in turn, outputting a system recovery control command; and outputting a system reset signal or a system power ON/OFF control signal in response to the system recovery control command.

The outputting of the system recovery control command may include counting a number of times the predetermined signal pattern is detected, and checking a time at which the predetermined signal pattern is detected.

The outputting of the system recovery control command may include restarting counting is in response to the detected signal pattern which does not occur during the designated period of time.

Other features and aspects will be apparent from the following detailed description, the drawings, and the claims.

Figure 1:
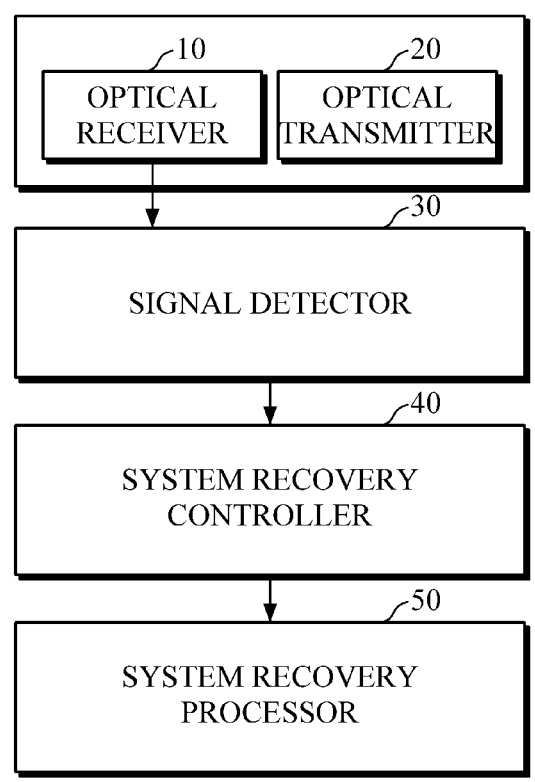
FIG. 1 is a block diagram illustrating an optical Ethernet apparatus according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

An optical Ethernet apparatus described herein may be one of an Ethernet switch equipped with optical ports, a VDSL concentrator, a wireless connector, a PON device, Home Gateway, and an Ethernet-based set-top box.

FIG. 1 is a block diagram illustrating an optical Ethernet apparatus according to an exemplary embodiment. Referring to FIG. 1, the optical Ethernet apparatus includes an optical receiver 10, an optical transmitter 20, a signal detector 30, a system recovery controller, and a system recovery processor.

The optical receiver 10 performs photoelectric conversion on packet data input through a transmission medium.

The optical receiver 20 performs electrophotic conversion for an output to an optical transmission medium.

The signal detector 30 detects whether the optical receiver 10 receives an effective optical signal, and then the detector 30 outputs a resulting signal. The effective optical signal refers to an optical signal having a power with an effective range. If it is detected that no signal is generated from the photoelectric conversion or a weak signal is received, the signal detector 30 outputs a negative logic level signal.

In one aspect, when an output from the signal detector 30 include a predetermined signal pattern that is repeated a predesignated number of times for a designated period of time, the system recovery controller 40 detects the output as a system recovery command, and then outputs a system recovery control command. For example, the predetermined signal pattern is a signal output pattern in which a signal detect/loss of signal (SD/LOS) signal is alternated a specific number of times. As will be described later, the system recovery control command is to reset a system or turn on or off a system power. In another aspect, as requirements for outputting the system recovery control command, a duration of time and the number of time for which the predetermined signal pattern has to be repeated may be predetermined. Therefore, the system recovery controller 40 may monitor outputs from the signal detector 30 and detect an output that satisfies the requirements. Only when an output that satisfies the requirements is detected, the system recovery controller 40 outputs the system recovery control command.

In one exemplary embodiment, the system recovery controller 40 may be implemented as a program. When the number of times that the predetermined signal pattern is detected within a threshold time designated by counting the time of loop reaches a threshold value, the system recovery controller 40 outputs the recovery control command. Another exemplary embodiment will be described later.

In one aspect, the system recovery processor 50 outputs a system reset signal or a system power ON/OFF control signal according to the system recovery control command. In one exemplary embodiment, the system recovery controller 40 may detect a system recovery command which resets a system or turns on or off the system power according to a type of predetermined signal pattern. In another exemplary embodiment, the system recovery controller 40 may detect a system recovery command which resets the system or turns on or off the system power according to a predesignated time or the predesignated number of times. The system recovery processor 50 may output a signal to control the system to be reset or to turn on or off the power according to the system recovery control command.

Figure 2A:
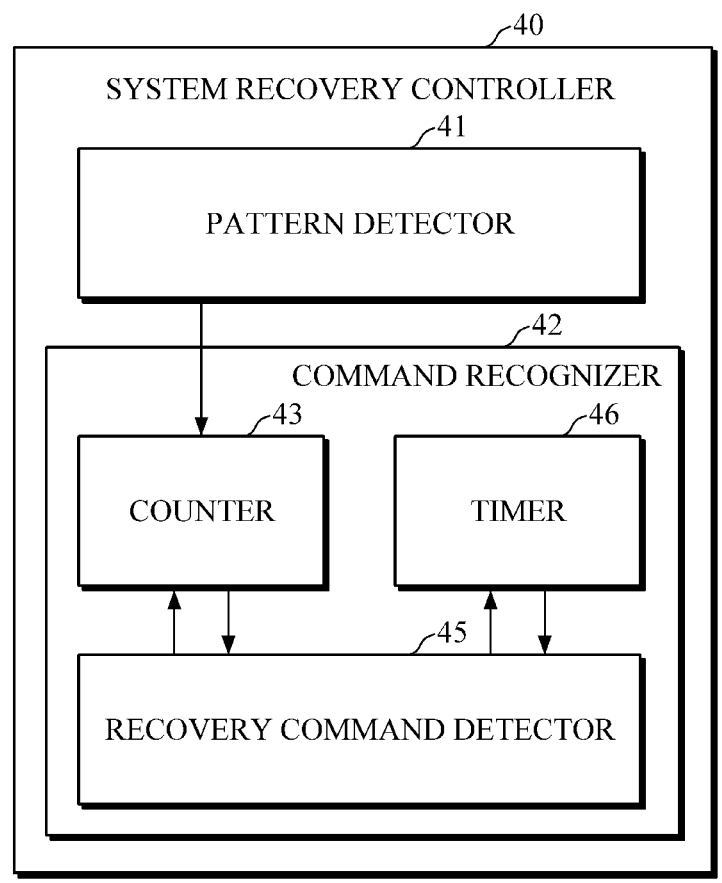
FIGS. 2A to 2C are block diagram illustrating a system recovery controller of the optical Ethernet apparatus.

FIG. 2A is a block diagram illustrating the system recovery controller according to another exemplary embodiment. Referring to FIG. 2A, the system recovery controller 40 may include a pattern detector 41 and a command recognizer 42. In the present embodiment, the pattern detector 41 and the command recognizer 42 are implemented as individual programmable logics.

In one aspect, the pattern detector 41 detects a predetermined signal pattern output from the pattern signal detector 30, and outputs a pattern detection signal. The pattern detector 41 is detection logic for a system recovery control command according to a related art. The pattern detector 41 is not directly connected to a central processing unit (CPU) that controls the system, and hence it is not possible to remotely upgrade or re-program the pattern detector 41. In one exemplary embodiment, when the signal detector 30 detects an effective optical signal among optical signals received from the optical receiver 10, and outputs the effective optical signal to the pattern detector 41, the pattern detector 41 continuously monitors the output signals. When detecting the predetermined signal pattern during monitoring the output signals, the pattern detector 41 outputs a pattern detection signal to the command recognizer 42 to indicate the detection of predetermined signal pattern. The predetermined signal pattern may be, for example, square wave that is periodically repeated five times. The predetermined signal pattern may result from periodically turning on or off the output power of the optical transmitter 20. The pattern detector 41 may output one pulse when detecting the arranged pattern.

In one exemplary embodiment, the command recognizer 42 counts the pattern detection signals and determines whether the predetermined signal pattern is repeated the designated number of times for a designated period of time. Referring to FIG. 2A, the command recognizer 42 includes a counter 43, a recovery command detector 45, and a timer 46. The counter 43 and the timer 46 each may be implemented as an independent circuit. The counter 43 counts the number of pattern detection signals output from the pattern detector 41 and outputs the count. The pattern detector 41 outputs a pattern detection signal each time the predetermined signal pattern is detected, and the counter 43 counts the number of pattern detection signals output from the pattern detector 41. The counter 43 cumulatively counts the number of pattern detection signals output.

The timer 46 may operate in one of plurality of modes that include an operation mode and a counter mode, wherein in the operation mode, an output line is switched to an activation state to indicate that a set period of time has elapsed, and in the counter mode, the timer 46 counts the time elapsed since reset and then outputs the count. Generally, the timer may refer to the former, but the present disclosure does not rule out the counter mode or modifications of the counter mode. The timer 46 is reset when the first signal pattern is detected and, in turn, the pattern detector 41 outputs a pulse.

The recovery command detector 45 reads the count output from the counter 43 and a value of the timer 46, and outputs a system recovery control command according to the read count and value. For example, the recovery command detector 45 outputs a system recovery control command when the count value of the counter reaches a threshold value, for example, 3, during a threshold time period, for example, 50 seconds, since the first signal pattern was received. If the count exceeds 3 (e.g., 5) or the count does not reach 3 (e.g., 2) during the 50 seconds, the recovery command detector 45 does not output the system recovery control command.

In another general aspect, the command recognizer 42 may reset the counter if the signal pattern detected by the pattern detector 41 was not generated during the designated period of time.

Figure 2B:
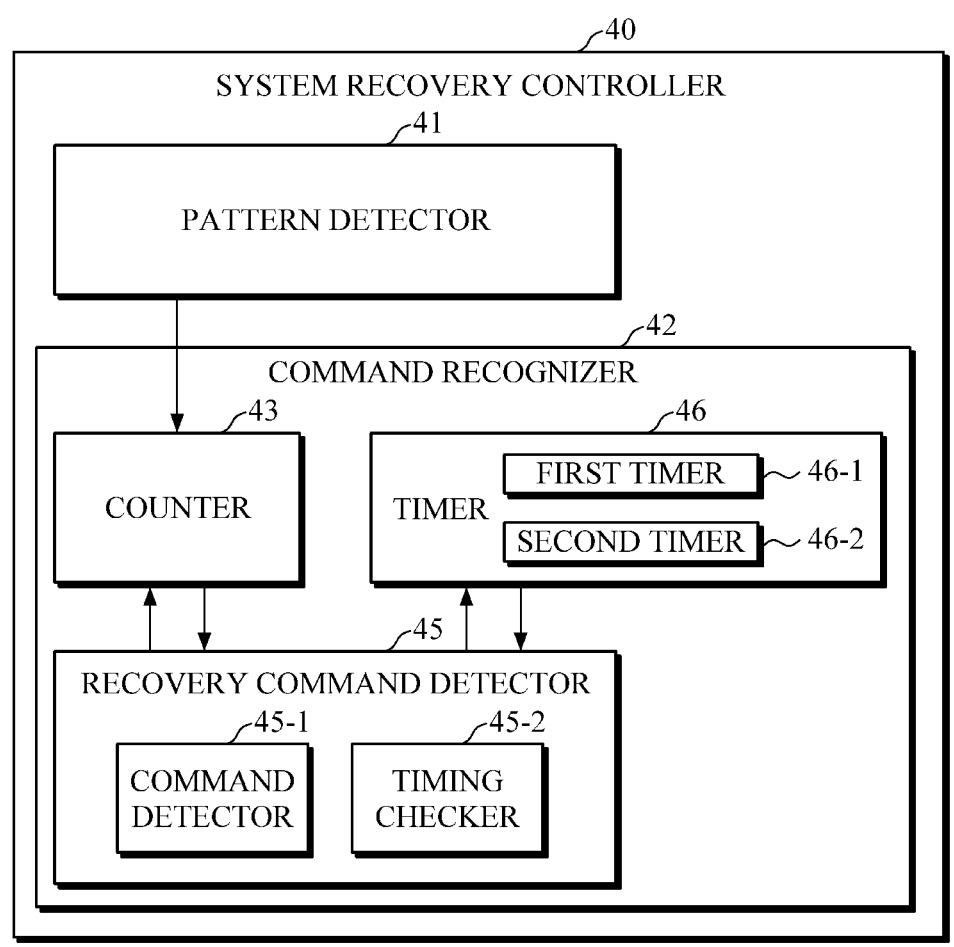

FIG. 2B is a block diagram illustrating the system recovery controller according to another exemplary embodiment. In FIG. 2B, a command recognizer 42 includes a counter 43, a recovery command detector 45, a first timer 46-1, and a second timer 46-2. The first timer 46-1 and the second timer 46-2 may be implemented as independent timers provided in one timer chip 46, and may form two channels on the single timer chip. The first timer 46-1 is reset when the command recognizer 42 waits for the first input of a pattern detection signal in order to determine whether a new system recovery control command is to be generated, and then the first timer 46-1 starts counting. The second timer 46 is reset each time the pattern detector 41 detects a signal pattern. For example, the first timer 46-1 may be set to 50 seconds and the second timer 46-2 may be set to 20 seconds.

In one aspect, the recovery command detector 45 may include a command detector 45-1 and a timing checker 45-2. The command detector 45-1 resets both the counter 46 and the first timer 46-1 and enters a standby mode. When the pattern detector 41 outputs a pulse that indicates the initial detection of a signal pattern, the count of the counter 46 is increased by 1. At this time, the timing checker 45-2 detects the count of the counter 43, resets the second timer 46-2 and enters a standby mode. For the command detector 45-1 and the timing checker 45-2 to detect changes in the count value of counter 43, various methods may be used, such as polling by which the value of counter 43 is periodically read, or interrupting a microprocessor or logic when a value of counter 43 changes, wherein the recovery command detector 45 implemented in the microprocessor or logic.

When the pattern detector 41 outputs a pulse that indicates another signal pattern is detected, a value of the counter 43 is increased to 2. At this time, the timing checker 45-2 detects the change in counter value and checks a state of the second timer 46-2. If the second timer 46-2 is still running, then it indicates that the second signal pattern arrives too early, and hence the timing checker 45-2 resets the counter 43. If the second timer 46-2 has ended, the timing checker 45-2 resets the second timer 46-2 and waits for another signal pattern. When the pattern detector 41 outputs a pulse that indicates the third signal pattern is detected, a value of the counter 43 is increased to 3. At this time, the timing checker 45-2 detects the change in counter value and checks a state of the second timer 46-2. If the second timer 46-2 is still running, then it indicates that the third signal pattern arrives too early, and thus the timing checker 45-2 resets the counter 43. If the second timer 46-2 has ended, the command detector 45-1 checks the first timer 46-1. If the first timer 46-1 has ended, it indicates that the predesignated threshold time has already elapsed, so the command detector 45-1 does not generate a system recovery control command, but returns to the initial state. If the first timer 46-1 has not ended, it indicates that three signal patterns have arrived within the predesignated threshold period of time, and thus the command detector 45-1 generates and outputs a system recovery control command.

For example, in the case where the first timer 46-1 is set to 50 seconds and the second timer 46-2 is set to 20 seconds, if predetermined signal patterns arrive at 0 second, 25 seconds, and 40 seconds, respectively, it means that the third signal pattern arrives 15 seconds after the second signal pattern, and hence a system recovery control command is not generated and the counter 43 is reset immediately after the third signal pattern has arrived. For example, if predetermined signal patterns arrive at 10 second, 23 seconds, and 49 seconds, respectively, it indicates that three signal patterns have arrived within 50 seconds at appropriate intervals, and hence a system recovery control command is output.

In one exemplary embodiment, when the optical Ethernet apparatus receives an optical signal through the optical receiver 10 and detects a system recovery command, the system controller 60 builds criteria for the command recognizer 42 to recognize a detected signal as a system recovery command. In one exemplary embodiment, the system controller 60 may specify the specific number of times and a threshold period of time for detecting a predetermined signal pattern, wherein the predetermined signal patterns constitute a system recovery command.

Figure 2C:
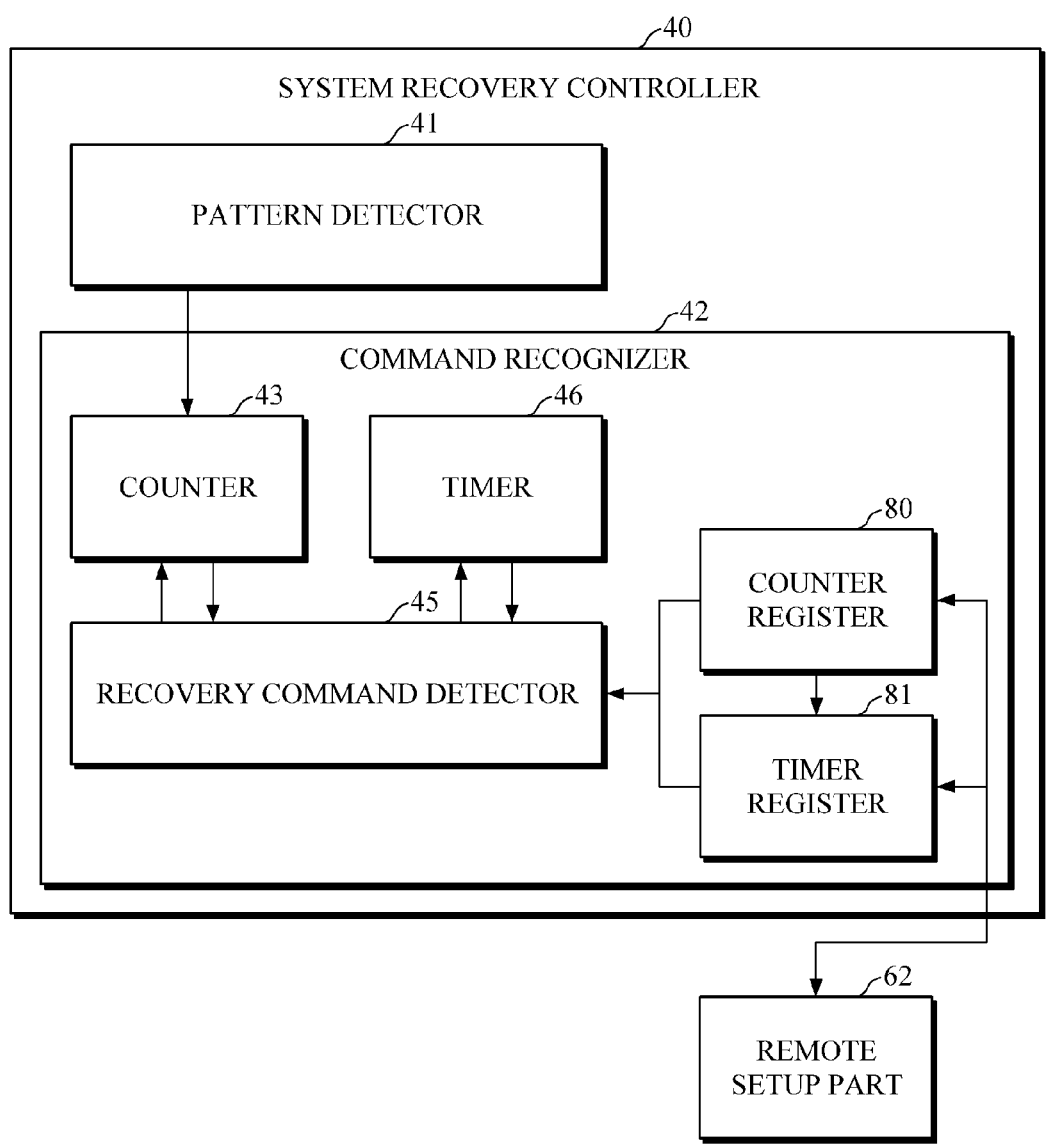

FIG. 2C is a block diagram illustrating the system recovery controller according to yet another exemplary embodiment. The example shown in FIG. 2C is similar to the system recovery controller of FIG. 2A, except that the system recovery controller of FIG. 2C further includes a counter register 80, a timer register 81, and a remote setup part 47.

In one exemplary embodiment, the remote setup part 47 is implemented as a program on a CPU that constitutes a system controller. The remote setup part 47 may receive data from an external source and record setting values extracted from said data in the counter register 80 and the timer register 81. The counter register 80 stores a threshold recovery value that is a reference, i.e., a setting value, of the counter 43. The timer register 81 stores a threshold time, i.e., a reference time value, of one or more timers that are included in the timer 46. The threshold time value may be a single constant for one timer, or two constants that specify a threshold range for two timers.

Figure 3:
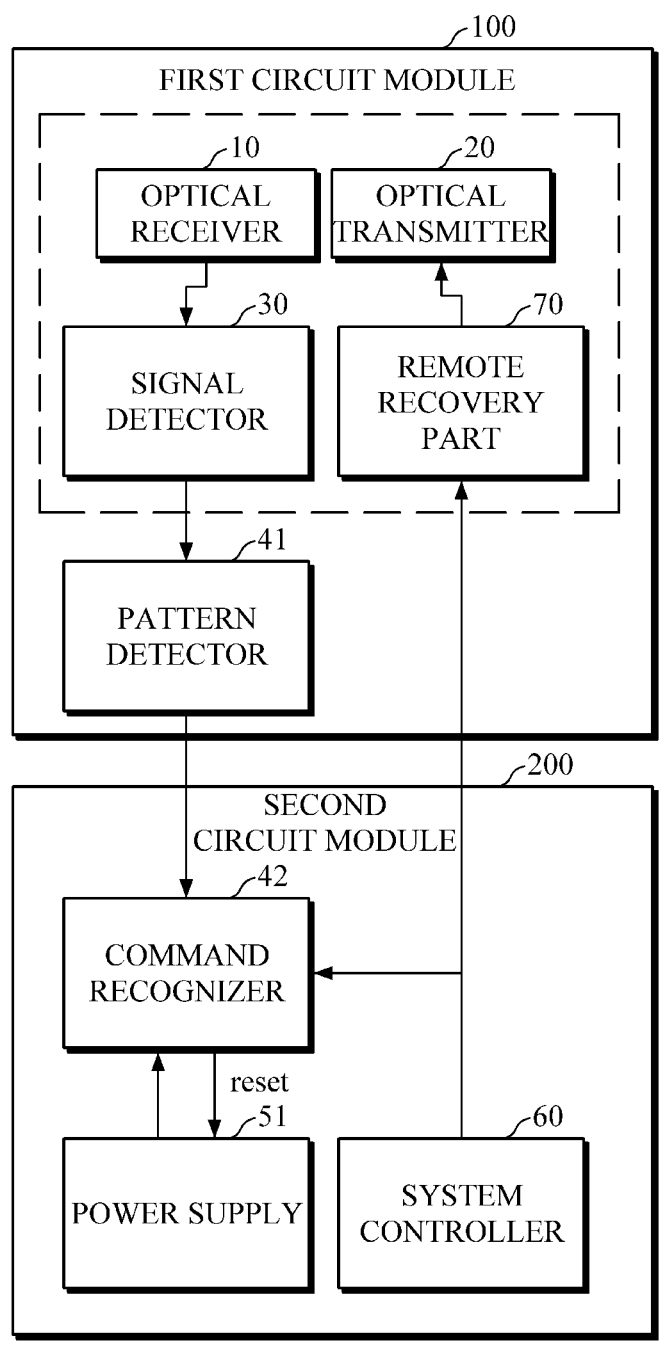
FIG. 3 is a block diagram illustrating a first circuit module and a second circuit module of an optical Ethernet apparatus according to another exemplary embodiment.

FIG. 3 is a block diagram illustrating an optical Ethernet apparatus according to another exemplary embodiment. Elements similar to those in FIGS. 1, 2A, 2B, and 2C are denoted by the same reference numerals.

Referring to FIG. 3, a power supply 51 provides power to the system. The entire system may be reset or turned on or off by powering on or off the power supply 51. In addition, the system may be reset by resetting the system controller 60 or assigning an interrupt to the system controller 60 to execute a reset routine that resets the entire system. The command recognizer 42 may output a system recovery control command to power on or off the power supply 51. As shown in FIG. 3, the optical Ethernet apparatus consists of a first circuit module 100 and a second circuit module 200. The first circuit module 100 includes an optical receiver 10, an optical transmitter 20, a signal detector 30, and a pattern detector 41. The second circuit module 200 includes a command recognizer 42, a power supply 51, and a system controller 60. In another exemplary embodiment, the first circuit module 100 may further include a remote recovery part 70.

In one aspect, the pattern detector 41 may be implemented as a programmable logic device, and the command recognizer 42 may be implemented as another programmable logic device connected to the system controller 60. In another aspect, the programmable logic device as the pattern detector 41 may be located in the first circuit module that includes the optical receiver 10 and the optical transmitter 20. In this case, the other programmable logic circuit as the command recognizer 42 may be located in the second circuit module that includes the power supply 51 and the system controller 60.

The signal detector 30 is integrated into a part of the optical receiver 10. The remote recovery part 70 is a switch to turn on/off transmission power of the optical transmitter 20 and is integrated into a part of the optical transmitter 20. The portion surrounded by a dotted line is provided as a commercialized optical connector part called an "optical transceiver." The pattern detector 41 is one programmable logic device mounted on a circuit board to which the optical connector part is mounted, and the first circuit module 100 is a technology applied to a conventional optical Ethernet apparatus.

In one exemplary embodiment, the pattern detector 41 and the command recognizer 42 are implemented as separate programmable logic devices. One programmable logic device for the pattern detector 41 is set to detect a predetermined signal pattern. Since said programmable logic device is not connected to the system controller 60 that controls the entire system, the programmable logic device, which has been initially programmed to detect a specific predetermined signal pattern in a manufacturing process, cannot be updated or re-programmed to detect another signal pattern.

In one exemplary embodiment, when the optical Ethernet apparatus receives an optical signal through the optical receiver 10 and detects a system recovery control command, the system controller 60 builds criteria for the command recognizer 42 to recognize a detected signal as a system recovery control command. In one exemplary embodiment, the system controller 60 may specify the specific number of times and a threshold period of time for detecting a predetermined signal pattern, wherein the predetermined signal patterns constitute a system recovery control command. The system controller 60 may change criteria for the command recognizer 42 implemented as another programmable logic device, regarding the number of times and a period of time for detecting a predetermined signal pattern.

The system controller 60 may program said programmable logic device, which is the command recognizer 42, by controlling the power supply 51. Said programmable logic device may be reconfigured to have new features by being reprogrammed through the system controller 60 and the power supply 51. The system controller 60 may control the power supply 51 to provide the programmable logic device that forms the command recognizer 42 with power needed for programming, and then sequentially output programming codes, which have been received from an external source, according to the programming sequence, thereby reprogramming said reprogrammable logic device. It is possible to configure the command recognizer 42 proposed herein by reprogramming an existing programmable logic device that is originally provided for a different function for the conventional technology.

The system controller 60 may control an optical signal output from the optical transmitter 20 in order for the optical Ethernet apparatus to remotely recover the system. In this case, the optical Ethernet apparatus may further include the remote recovery part 70 that controls ON/OFF of the transmission power of the optical transmitter 20 in response to a remote system recovery command which occurs when a predetermined signal pattern is repeated a predesignated number of times for a predesignated length of time.

Figure 4:
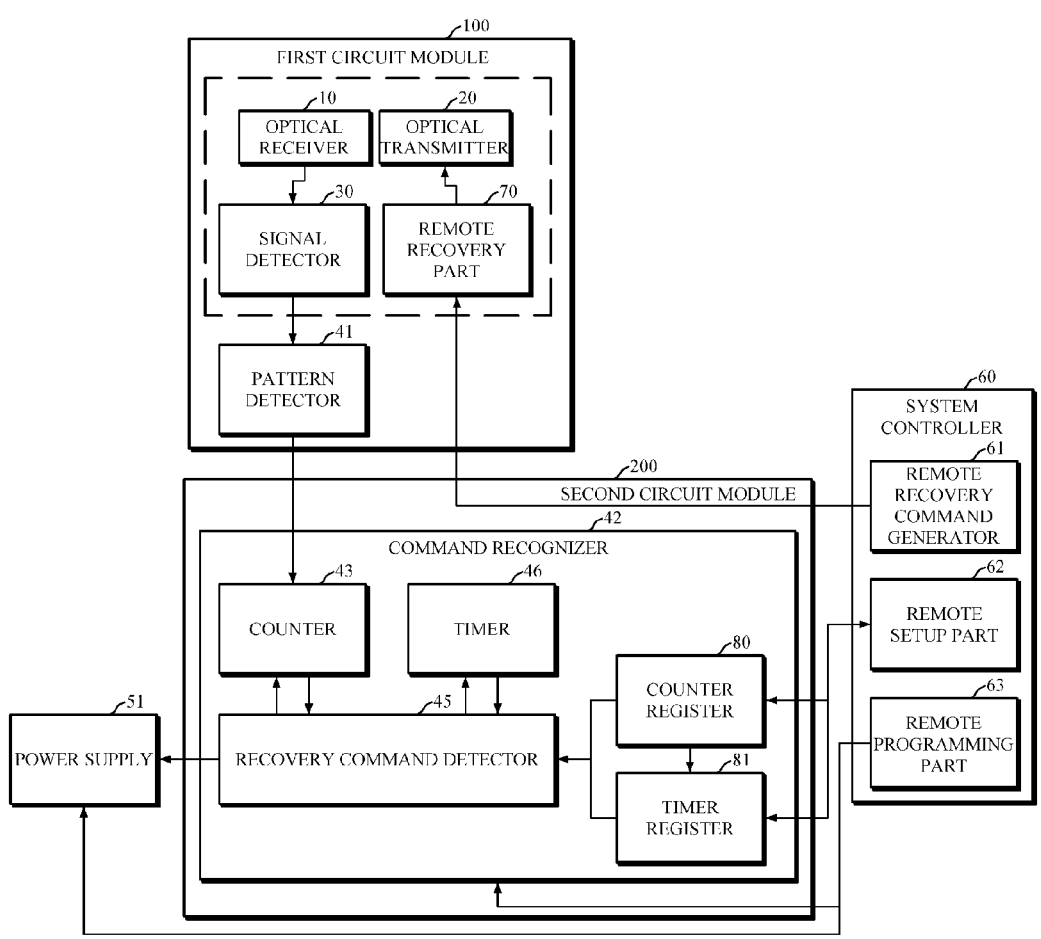
FIG. 4 is a block diagram illustrating in detail the optical Ethernet apparatus of FIG. 3.

FIG. 4 is a block diagram illustrating in detail the optical Ethernet apparatus of FIG. 3. Referring to FIG. 4, the command recognizer 42 includes the recovery command detector 45, the counter 43, and the timer 46. The exemplary embodiments of the command recognizer 42 are already described as above with reference to FIGS. 2A to 2C. In another aspect, the command recognizer 42 may include the counter register 80 and the timer register 81, which are already described above.

In one aspect, the system controller 60 may further include a remote recovery command generator 61 that outputs a remote system recovery command which occurs when a predetermined signal pattern occurs repetitively a predesignated number of times for a predesignated period of time. The remote recovery command generator 61 outputs a pulse waveform to the remote recovery part 70 such that a signal pattern occurs repetitively a predesignated number of times for a predesignated period of time. In FIG. 4, the remote recovery command generator 61 is implemented by program codes in the CPU that constitutes the system controller 60, but the present disclosure is not limited to thereto, such that the remote recovery command generator 61 may be implemented by a variety of known programmable logic devices or dedicated circuitry.

The remote recovery command generator 61 outputs a remote system recovery control command which occurs when a predetermined signal pattern occurs repetitively a predesignated number of times for a predesignated period of time. In one exemplary embodiment, the remote recovery command generator 61 outputs a remote system recovery control command according to requirements regarding repetition for the predetermined signal pattern to be recognized as a system recovery control command by another optical Ethernet apparatus. For example, the predetermined signal pattern is a pattern of a SD/LOS signal that is output repetitively a certain number of times.

In one exemplary embodiment, the remote recovery part 70 is configured to include a semiconductor switch that turns on/off the transmission power of the optical transmitter 20. The remote recovery part 70 controls ON/OFF of the transmission power of the optical transmitter 20 in response to the remote system recovery control command output from the remote recovery command generator 61. The remote discovery part 70 controls the predetermined signal pattern to occur a certain number of times for a certain period of time such that the optical Ethernet apparatus that receives said signal pattern can recognize the system recovery command and, in turn, recovers a system.

In one aspect, the system controller 60 may further include a remote setup part 62 to set the counter register 80 and the timer register 81 according to data value received from an external source. The remote setup part 62 extracts data by parsing, for example, data packets received through a network, determines a counter register value and a timer register value among the extracted data, and records the two register values. In the exemplary embodiment, the remote setup part 62 is implemented by program codes in the CPU that constitutes the system controller 60, but the present disclosure is not limited to thereto, such that the remote setup part 62 may be implemented by a variety of known programmable logic devices or dedicated circuitry.

The system controller 60 may further include a remote programming part 63 that includes program codes for programing a second circuit module by controlling the power supply. The remote programming part 63 downloads a program through a network to program a programmable logic device. Then, the remote programming part 63 controls the power supply 51 to increases the power of electric signals, which are output from the system controller 60 to the command recognizer 42, to a level suitable for programing the programmable logic device. It is possible to configure the command recognizer 42 proposed herein by reprogramming an existing programmable logic device that is originally provided for a different function for the conventional technology. In the exemplary embodiment, the remote programming part 63 is implemented by program codes in the CPU that constitutes the system controller 60, but the present disclosure is not limited thereto, such that the remote programming part 63 may be implemented by a variety of known programmable logic devices or dedicated circuitry.

In another aspect, the optical Ethernet device may include multiple optical transmitters, multiple optical receivers, multiple signal detectors, multiple pattern detectors, a plurality of command recognizer provided respectively to the multiple pattern detectors, and a logic detector that outputs a system recovery control command when any one of the command recognizers detects a system recovery command.

Figure 5:
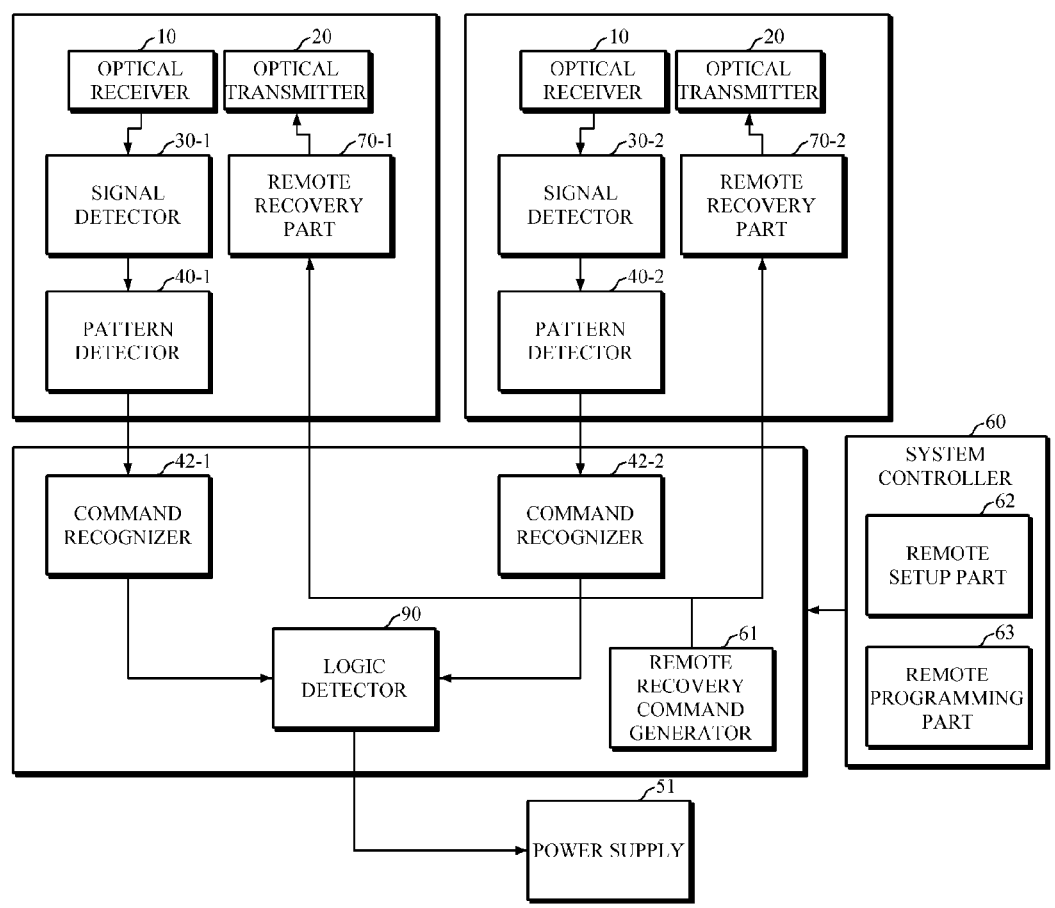
FIG. 5 is a block diagram illustrating an optical Ethernet apparatus that receives optical signals from multiple transmission media according to another exemplary embodiment.

FIG. 5 is a block diagram illustrating the optical Ethernet apparatus according to yet another exemplary embodiment. Referring to FIG. 5, the optical Ethernet apparatus may include two optical transmitters 20-1 and 20-1, two optical receivers 10-1 and 10-2, two signal detectors 30-1 and 30-2, and two pattern detectors 40-1 and 40-2. However, the number of each element described above is not limited to 2, and it may vary. When each of the optical receivers 10-1 and 10-2 receives an optical signal, each of the pattern detectors 40-1 and 40-2 provided to each of the optical receivers 10-1 and 10-2 detects a predetermined signal pattern. Each of the command recognizers 42-1 and 42-2 provided to each of the pattern detector 40-1 and 40-2 determines whether the predetermined signal pattern is a system recovery command.

The optical Ethernet apparatus includes the logic detector 90 that outputs a system recovery control command when one of the command recognizers 42-1 and 42-2 detects a system recovery command. The logic detector 90 outputs a system reset signal or a system power ON/OFF control signal when one of the command recognizers 42-1 and 42-2 detects a system recovery command. In one exemplary embodiment, the logic detector 90 is an OR gate, outputting a system recovery control command in response to a system recovery command detected by one of the command recognizers 42-1 and 42-2.

In one aspect, the pattern detectors 40-1 and 40-2 are implemented as one programmable logic device, and the command recognizers 42-1 and 42-2 and the logic detector 90 are implemented as another programmable logic device connected to a system controller. Unlike the exemplary embodiment described above, the remote recovery command generator 61 is also implemented in the same programmable logic device as the command recognizers 42-1 and 42-2 and the logic detector 90. When the system controller 60 instructs the transmission of a remote recovery control command, the remote recovery command generator 61 generates a remote recovery command with reference to the internal counter register and timer register and outputs said command to one of a plurality of optical connector modules, i.e., a designated port, wherein the remote recovery command occurs when a predetermined signal pattern is repeated a threshold number of times for a threshold period of time.

In another aspect, the programmable logic device in which the pattern detectors are implemented is located in a first circuit module that includes the optical receiver and the optical transmitter, and the other programmable logic device in which the command recognizers 42-1 and 42-2, the logic detector 90 and the remote recovery command generator 61 are implemented is located in a second circuit module that includes the power supply 51 and the system controller 60. Since the plurality of command recognizers 42-1 and 42-2, the logic detector 90, and the remote recovery command generator 61 are all implemented as one programmable logic device, actual electronic parts of the present exemplary embodiment are similar to those of the exemplary embodiment shown in FIG. 4, except that a plurality of first circuit modules are provided, which are optical connector modules. In the present exemplary, remote setting and/or remote programming are also possible, as shown in FIG. 4.

Figure 6:
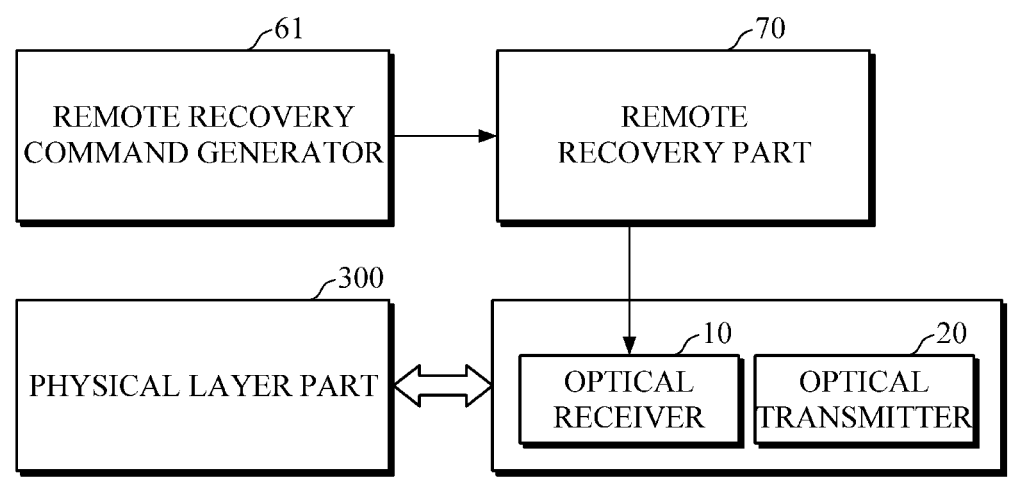
FIG. 6 is a block diagram illustrating an optical Ethernet apparatus capable of remotely recovering a system of another optical Ethernet apparatus.

FIG. 6 is a block diagram illustrating an optical Ethernet apparatus capable of remotely recovering a system of another optical Ethernet apparatus. Referring to FIG. 6, the optical Ethernet apparatus includes an optical receiver 10 to perform photoelectric conversion on packet data input through an optical transmission medium, an optical transmitter 20 to perform electrophotic conversion for an output to the optical transmission medium, and a physical layer part 300 which is an OSI physical layer for encoding and decoding transmission and reception data and data serialization/deserialization.

The optical Ethernet apparatus may include a remote recovery command generator 61, a recovery command generator 61, and a remote recovery part 70. The remote recovery command generator 61 outputs a remote system recovery command that occurs when a predetermined signal pattern is repeated a predetermined number of times for a predetermined period of time. The remote recovery part 70 controls ON/OFF of transmission power of the optical transmitter 20 in response to a remote system recovery command output from the recovery command generator 61. As described above, the optical Ethernet apparatus is able to remotely control another optical Ethernet apparatus by the use of the remote recovery command generator 61 and the remote recovery command generator 70.

In one aspect, the remote recovery command generator 61 outputs a remote system recovery control command that occurs when a predetermined signal pattern is repeated a predesignated number of times for a predesignated period of time. In one exemplary embodiment, the remote recovery command generator 61 outputs a remote system recovery control command according to requirements regarding repetition for the predetermined signal pattern to be recognized as a system recovery command by another optical Ethernet apparatus.

The remote recovery part 70 controls ON/OFF of transmission power of the optical transmitter 20 in response to a remote system recovery control command output from the remote recovery command generator 61. The remote recovery part 70 controls the predetermined signal pattern to be output by controlling ON/OFF of the transmission power of the optical transmitter 20. In addition, the remote recovery part 70 controls the predetermined signal pattern to occur a specific number of times for a specific period of time, so that the optical Ethernet apparatus that receives said signal pattern can recognizes said signal pattern as the system recovery command and, in turn, recovers a system. The remote recovery command generator 61 may be implemented as a programmable logic device or a program in a CPU that constitutes the system controller.

Figure 7:
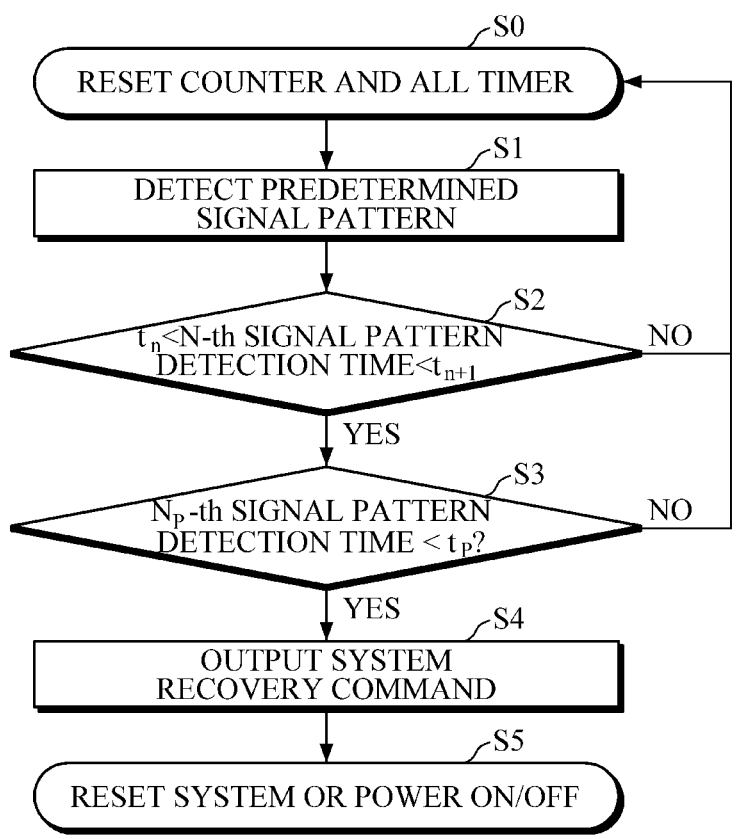
FIG. 7 is a flowchart illustrating a recovery method for recovering a system of an optical Ethernet apparatus according to an exemplary embodiment.

FIG. 7 is a flowchart illustrating a recovery method for recovering a system of an optical Ethernet apparatus according to an exemplary embodiment. The recovery method includes detection of a predetermined signal pattern of a system recovery command, as depicted in S1. For example, the predetermined signal pattern may be an output pattern of an SD/LOS signal.

Thereafter, a system recovery command that occurs when the predetermined signal pattern is repeated a predesignated number of times $N_p$ for a predesignated period of time $t_p$ is detected, as depicted in S2 and S3, and then said system recovery command is output, as depicted in S4. In the exemplary embodiment, $N_p$ and $t_p$ are set in advance, and can be re-set, as needed.

Then, a system reset signal or a system power ON/OFF control signal is output in response to a system recovery control command, as depicted in S5.

In one aspect, an operation of outputting the system recovery control command includes operation S2 in which the number of times the predetermined signal pattern is detected is counted and operation S3 in which the time at which the predetermined signal pattern is detected is checked.

In one exemplary embodiment, the number of times a predetermined signal pattern is detected is counted and it is checked whether the N-th signal pattern occurs during a designated period of time (from $t_n$ to $t_{n+1}$. In the exemplary embodiment, a threshold time period (from $t_2$ to $t_3$) during which the second signal pattern is to be detected and a threshold time period (from $t_3$ to $t_4$) during which the third signal pattern is to be detected may be set to be different from each other. If the N-th signal pattern occurs during the designated period of time, the number of times the predetermined signal pattern is detected continues to be counted and it is checked whether the count of said number of times reaches a threshold value $N_p$ until a threshold time $t_p$.

In one aspect, the operation of outputting the system recovery control command may further include an operation of restarting the count of the detected predetermined signals if the detected signal pattern does not occur during a designated period of time. In one exemplary embodiment, if the N-th signal pattern does not occur during a designated period of time (from $t_n$ to $t_{n+1}$), the counter 43 and the timer 46 are reset. In another exemplary embodiment, if the N-th signal pattern occurs during a designated period of time and hence the number of times the predetermined signal pattern is detected continues to be counted, but the count of said number of times does not reach a threshold value $N_p$ until a threshold time $t_p$ or reaches the threshold value $N_p$ after the threshold time $t_p$, the counter 43 and the timer 46 are both reset.

Figure 8:
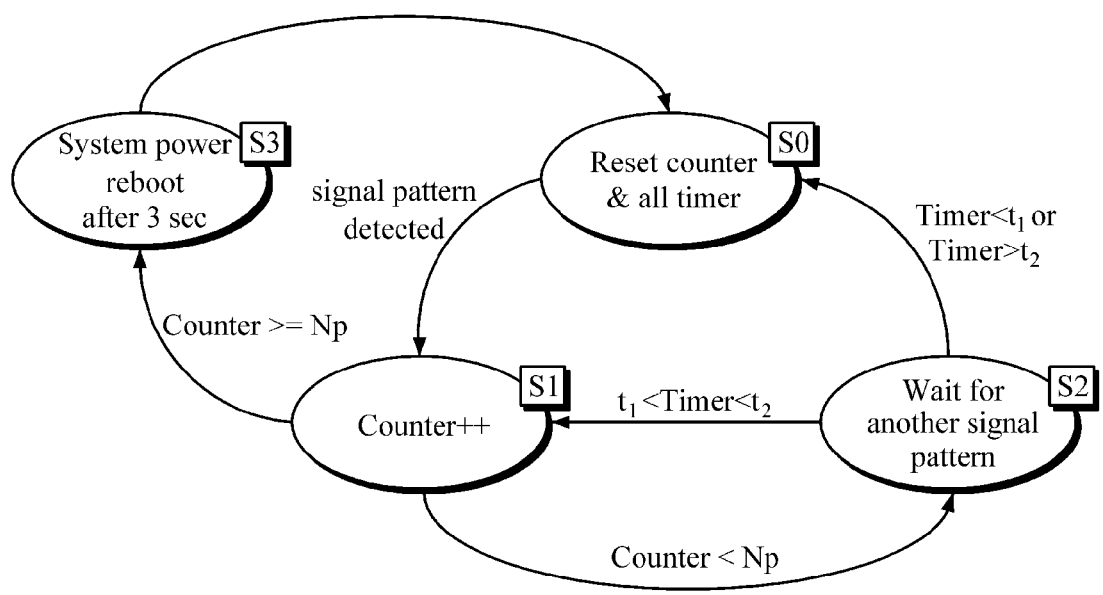
FIG. 8 is a state transition diagram of a control flow of an optical Ethernet apparatus applicable to the above exemplary embodiments shown in FIGS. 1 to 7.

FIG. 8 is a state transition diagram of a control flow of an optical Ethernet apparatus applicable to the above exemplary embodiments. Referring to FIG. 8, at initial state S0, a counter and timers are reset. If a signal pattern is detected during a standby state, the state is switched to state S1 and then the counter is increased by 1. Then, if a checked counter value is smaller than a threshold recovery value $N_p$, the state is switched to state S2. At state S2, the apparatus waits for another signal pattern, and when receiving the signal pattern, checks the timer. If the apparatus receives the signal pattern when the timer value falls within a reference range of values, the state is switched to state S1. If the apparatus receives the signal pattern when the timer value falls out of the reference range of values, the state is switched to state S0, at which the timers and the counter are all initialized. If the counter value reaches a threshold recovery value Np as state S1 and state S2 are repeatedly switched, the counter value is checked at state S1. If the checked counter value is equal to or greater than the threshold recovery value $N_p$, the state is switched to S3 and the system power is rebooted after a specific period of time, for example, 3 seconds.

According to the above exemplary embodiments, a system of an optical Ethernet apparatus is recovered remotely, and a control signal for generating a system recovery command may be configured to include particular pattern and particular requirements regarding repetition of said pattern. Using the control signal, it is possible to generate a system recovery command only when the particular pattern occurs at accurate timing, so that it is prevented that an undesired system recovery command is generated due to unstable factors on a line.

In addition, it is possible to remotely set or update a timing requirement for the occurrence of a pattern.

Furthermore, it is possible to apply the technology suggested herein to a conventional optical Ethernet apparatus by remotely re-programming a programmable logic of said optical Ethernet apparatus.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical Ethernet apparatus comprising:
    an optical receiver configured to perform photoelectric conversion on packet data received through an optical transmission medium;
    an optical transmitter configured to perform electrophotic conversion for an output to an optical transmission medium;
    a signal detector configured to detect whether the optical receiver receives an effective optical signal and output a resulting detection signal;
    a system recovery controller configured to detect, as a system recovery command, an output from the signal detector that includes a predetermined pattern which is repeated a designated number of times for a designated period of time, and to output a system recovery control command; and a system recovery processor configured to output a system reset signal or a system power ON/OFF control signal in response to the system recovery control command.

2. The optical Ethernet apparatus of claim 1, wherein the system recovery controller comprises:
a pattern detector configured to detect a predetermined signal pattern output from the signal detector and, in turn, output a pattern detection signal, and
a command recognizer configured to, in response to the pattern detection signal, detect whether the predetermined signal pattern is repeated the designated number of times for the designated period of time.

3. The optical Ethernet apparatus of claim 2, wherein the command recognizer comprises:
a counter configured to count pattern detection signals and output a count value,
a timer configured to count up time, and
a recovery command detector configured to output the system recovery control command in response to the count value of the counter reaching a threshold recovery value before an output of the timer reaches a threshold time.

4. The optical Ethernet apparatus of claim 3, wherein the command recognizer further comprises a timing checker configured to reset the counter in response to a signal pattern which is detected by the pattern detector and does not occur during the determined period of time.

5. The optical Ethernet apparatus of claim 4, wherein the system recovery controller comprises a counter register configured to store a threshold recovery value of the counter and a timer register configured to store a threshold time of the timer and a designated time range of the timing checker, and the system controller further includes a remote setup part configured to set a value of the counter register and a value of the timer register according to data values received from an external source.

6. The optical Ethernet apparatus of claim 2, wherein the pattern detector is implemented as a first programmable logic device and the command recognizer is implemented as a second programmable logic device connected to a system controller.

7. The optical Ethernet apparatus of claim 6, wherein the command recognizer comprises
a counter configured to output pattern detection signals and output a count value,
a timer configured to count up time, and
a recovery command detector configured to output the system recovery control command in response to the count value of the counter reaching a threshold recovery value before an output of the timer reaches a threshold time.

8. The optical Ethernet apparatus of claim 7, wherein the command recognizer further comprises a timing checker configured to reset the timer in response to a signal pattern which is detected by the pattern detector and does not occur during the determined period of time.

9. The optical Ethernet apparatus of claim 6, wherein the first programmable logic device is located in a first circuit module that includes the optical receiver and the optical transmitter.

10. The optical Ethernet apparatus of claim 6, wherein the second programmable logic device is located in a second circuit module that includes the power supply and the system controller.

11. The optical Ethernet apparatus of claim 10, wherein the system controller further comprises a remote programming part that includes program codes for programming the second programmable logic device by controlling the power supply.

12. The optical Ethernet apparatus of claim 1, further comprising:
a remote recovery command generator configured to output a remote system recovery command that occurs when a predetermined signal pattern is repeated a designated number of times for a designated period of time; and
a remote recovery part configured to control ON/OFF of transmission power of the optical transmitter in response to the remote system recovery command output from the remote recovery command generator.

13. An optical Ethernet apparatus comprising:
a plurality of optical transmitters as set forth in claim 2;
a plurality of optical receivers as set forth in claim 2;
a plurality of signal detectors as set forth in claim 2;
a plurality of pattern detectors as set forth in claim 2;
a plurality of command recognizers, each of which is provided to each of the plurality of pattern detectors; and
a logic detector configured to output a system recovery control command in response to a system recovery command being detected from one of the plurality of command recognizers.

14. The optical Ethernet apparatus of claim 13, wherein the pattern detector is implemented as a first programmable logic device and the plurality of command recognizers and the logic detector are implemented as a second programmable logic device connected to a system controller.

15. The optical Ethernet apparatus of claim 14, wherein the first programmable logic device is located in a first circuit module that comprises the optical receivers and the optical transmitters, and the second programmable logic device is located in the second circuit module that comprises the power supply and the system controller.

16. The optical Ethernet apparatus of claim 13, wherein the system controller further comprises a remote setup part configured to set a value of the counter register and a value of the timer register according to data values received from an external source.

17. An optical Ethernet apparatus comprising:
an optical receiver configured to perform photoelectric conversion on packet data received through an optical transmission medium;
an optical transmitter configured to perform electrophotic conversion for an output to an optical transmission medium;
a remote recovery command generator configured to output a remote system recovery command that occurs when a predetermined signal pattern is repeated a designated number of times for a designated period of time; and
a remote recovery part configured to control ON/OFF of transmission power of the optical transmitter in response to the remote system recovery command output from the remote recovery command generator.

18. A recovery method for an optical Ethernet apparatus comprising:
detecting a predetermined signal pattern of a system recovery command;
detecting a system recovery command that occurs when a predetermined signal pattern is repeated a designated number of times for a designated period of time, and, in turn, outputting a system recovery control command; and outputting a system reset signal or a system power ON/OFF control signal in response to the system recovery control command.

19. The recovery method of claim 18, wherein the outputting of the system recovery control command comprises counting a number of time the predetermined signal pattern is detected, and checking a time at which the predetermined signal pattern is detected.

20. The recovery method of claim 19, wherein the outputting of the system recovery control command comprises restarting counting in response to the detected signal pattern which does not occur during the designated period of time.

* * * * *